(12) United States Patent
Ryberg et al.

(10) Patent No.: US 9,238,414 B2
(45) Date of Patent: Jan. 19, 2016

(54) CHARGING SYSTEM FOR BATTERY-POWERED UNMANNED AERIAL VEHICLES

(71) Applicant: The Boeing Company, Seal Beach, CA (US)

(72) Inventors: Caitlin Ryberg, Renton, WA (US); Leonard J. Quadracci, Seattle, WA (US)

(73) Assignee: The Boeing Company, Chicago, IL (US)

( * ) Notice: Subject to any disclaimer, the term of this patent is extended or adjusted under 35 U.S.C. 154(b) by 25 days.

(21) Appl. No.: 14/146,060

(22) Filed: Jan. 2, 2014

(65) Prior Publication Data
US 2015/0183326 A1    Jul. 2, 2015

(51) Int. Cl.
*H02J 7/00* (2006.01)
*H02J 7/14* (2006.01)
*H02J 1/00* (2006.01)
*H02J 1/08* (2006.01)
*H02J 1/10* (2006.01)
*H02J 3/10* (2006.01)
*H02J 3/14* (2006.01)
*B60L 11/18* (2006.01)

(52) U.S. Cl.
CPC .................................. *B60L 11/1809* (2013.01)

(58) Field of Classification Search
CPC ...................................................... H02J 7/0042
USPC ................. 320/109, 104, 107, 114, 115, 138; 307/11, 12, 18–20, 24, 29–35, 38–39
See application file for complete search history.

(56) References Cited

U.S. PATENT DOCUMENTS

| | | | |
|---|---|---|---|
| 3,037,646 A * | 6/1962 | Petit | E04H 6/12 187/267 |
| 3,273,038 A * | 9/1966 | Miller | 320/109 |
| 5,767,655 A * | 6/1998 | Ostendorff et al. | 320/107 |
| 8,511,606 B1 | 8/2013 | Lutke et al. | |
| 8,558,507 B2 * | 10/2013 | Uchihashi et al. | 320/128 |
| 2003/0218307 A1* | 11/2003 | Anderson et al. | 280/79.2 |
| 2009/0071751 A1* | 3/2009 | Schmidt et al. | 182/63.1 |
| 2009/0266775 A1* | 10/2009 | Vanderhoek et al. | 211/49.1 |
| 2010/0176762 A1* | 7/2010 | Daymude et al. | 320/115 |
| 2012/0263989 A1* | 10/2012 | Byun et al. | 429/99 |
| 2013/0134928 A1* | 5/2013 | Uchihashi et al. | 320/107 |
| 2014/0062390 A1* | 3/2014 | Webber | H02J 7/0027 320/107 |

* cited by examiner

*Primary Examiner* — Richard Isla Rodas
*Assistant Examiner* — Mohammed J Sharief
(74) *Attorney, Agent, or Firm* — Womble Carlyle Sandridge & Rice LLP

(57) ABSTRACT

A rack system is provided that includes a plurality of trays configured to hold a respective plurality of battery-powered UAVs, and a frame configured to support the plurality of trays in a vertical arrangement. Each tray of the plurality of trays includes a platform, bumper and first plurality of electrical contacts. The platform may be configured to carry a UAV of the plurality of battery-powered UAVs. The bumper may be sized and positioned on the platform to guide the UAV to a resting position on the platform. And the first plurality of electrical contacts may be connected to a battery-charging apparatus, and configured to physically and electrically contact a respective second plurality of electrical contacts connected to a respective plurality of batteries on the UAV at the resting position on the platform. A related battery-charging apparatus including a charge switching system for charging battery-powered UAVs is also provided.

19 Claims, 13 Drawing Sheets

CHARGING SYSTEM FOR BATTERY-POWERED UNMANNED AERIAL VEHICLES

TECHNOLOGICAL FIELD

The present disclosure relates generally to aircraft and, in particular, to a charging system for battery-powered aircraft.

BACKGROUND

An unmanned aerial vehicle (UAV) is an aircraft that flies without human operators being present in the aircraft. These UAVs may be controlled from a remote location. At this remote location, a human operator or a program executed by a computer generates commands for the UAV. Or in other examples, a program running on a computer or other controller on the UAV may generate commands for the UAV.

UAVs may be used for a number of different purposes. Currently, the largest use is for military applications, such as reconnaissance missions, attack missions or other suitable types of missions. UAVs also may be used in a number of civilian applications, such as to perform surveying, firefighting or other suitable types of missions. In one more particular example of a civilian application, UAVs may be used in agricultural applications to provide a remotely-sensed imagery-based decision product that aids farmers by determining the health and status of their crops.

UAVs may come in a number of different shapes and sizes. For example, UAVs may take the form of fixed wing aircraft, helicopters, ornithopters, or some other suitable type of device capable of flying. And the sizes of these UAVs may vary greatly, some of which may have a wing span from about a few inches to about 200 feet.

In a number of applications it may be desirable to operate UAVs and more often smaller UAVs in large numbers, which may increase the monitoring that can be performed for a particular area. Smaller UAVs, however, present a number of challenges as compared to their larger counterparts. Storage and transport of smaller UAVs may be more involved. And their range is often shorter, requiring more frequent charging or refueling.

Therefore, it would be advantageous to have an apparatus and method that takes into account one or more of the issues discussed above, as well as other possible issues.

BRIEF SUMMARY

Example implementations the present disclosure are generally directed to an apparatus and method for the simultaneous storage and charging of multiple battery-powered aircraft such as unmanned aerial vehicles (UAVs), and without removal of their batteries. The storage capabilities may allow more UAVs per operator and mission, and may increase the efficiency of such operation. The charging capabilities may increase the cost feasibility of operating these aircraft, such as by using less equipment than may otherwise be required to individually charge multiple UAVs in a given period of time. Example implementations may additionally provide safety protection, as well as efficient and customizable charging configurations for quickly charging these aircraft and reduced manual labor that may otherwise be required to remove their batteries for charging.

According to one aspect of example implementations of the present disclosure, a rack system is provided. The rack system may include a plurality of trays configured to hold a respective plurality of battery-powered UAVs, and a frame configured to support the plurality of trays in a vertical arrangement. Each tray of the plurality of trays includes a platform, bumper and first plurality of electrical contacts. The platform may be configured to carry a UAV of the plurality of battery-powered UAVs. The bumper may be sized and positioned on the platform to guide the UAV to a resting position on the platform. And the first plurality of electrical contacts may be connected to a battery-charging apparatus, and configured to physically and electrically contact a respective second plurality of electrical contacts connected to a respective plurality of batteries on the UAV at the resting position on the platform.

In some examples, electrical contacts of the first plurality of electrical contacts are spring-loaded contacts configured to physically and electrically contact electrical contacts of the respective second plurality of electrical contacts that are flush with an underside surface of the UAV.

In some examples, the platform may have a semipermeable construction to allow passage of at least water therethrough. Similarly, in some examples, the rack system may further include a barrier such as a waterproof and/or fireproof barrier located between the plurality of trays and battery-charging apparatus.

In some examples, the battery-charging apparatus may include one or more battery chargers and a charge switching system. In these examples, the battery charger(s) may be electrically connected to one or more power supplies. The charge switching system may be electrically connected to the battery charger(s) and first plurality of electrical contacts of each tray of the plurality of trays. The charge switching system may be configured to switchably, electrically connect or disconnect the battery charger(s) and first plurality of electrical contacts of each tray of the plurality of trays. In this regard, each of the battery charger(s) in any given instance may be electrically connectable to the first plurality of electrical contacts of one or more but fewer than all of the plurality of trays.

In some examples, each tray of the plurality of trays may be horizontally movable with respect to the vertical arrangement. In these examples, the frame may include a plurality of latches each of which is configurable between a locked position to secure a tray of the plurality of trays in the vertical arrangement, an unlocked position to allow horizontal movement of the tray.

In some examples, each tray of the plurality of trays may be horizontally movable with respect to the vertical arrangement. In these examples, the rack system may further include a clip affixed and vertically movable with respect to the frame, and into which a tray of the plurality of trays is securable in an instance in which the tray is moved horizontally out from the vertical arrangement. The tray secured to the clip may thereby be horizontally secured and vertically movable with respect to the vertical arrangement.

In some further examples, the rack system may further include a reel affixed to the frame and having a cable woundable thereabout. The cable may have opposing ends one of which is affixed to the reel and the other of which is affixed to the tray of the plurality of trays secured to the clip. The cable may thereby control vertical movement of the tray secured to the clip.

In some examples, the rack system may further include the battery-charging apparatus electrically connectable to a generator of a vehicle configured to transport the rack system. In these examples, the frame may be connectable to a lift of the vehicle. And the lift may be configured to selectively raise the rack system for transport, and lower the rack system for accessing the plurality of trays and UAVs held thereby.

According to another aspect of example implementations of the present disclosure, a battery-charging apparatus is provided. The battery-charging apparatus may include one or more battery chargers and a charge switching system. The battery charger(s) may be electrically connected to one or more power supplies, and the charge switching system may be electrically connected to the battery charger(s) and a first plurality of electrical contacts of each tray of a plurality of trays of a rack system. The rack system may include the plurality of trays supported in a vertical arrangement and configured to hold a respective plurality of battery-powered UAVs. Similar to above, each tray of the plurality of trays may include a platform, bumper and first plurality of electrical contacts. Also similar to above, the charge switching system may be configured to switchably, electrically connect or disconnect the battery charger(s) and first plurality of electrical contacts of each tray of the plurality of trays.

In some examples, the battery-charging apparatus may further include the power supply/supplies that are electrically connectable to a generator of a vehicle configured to transport the rack system.

In some examples, the charge switching system may be configured to switchably, electrically connect or disconnect the battery charger(s) to one or more sets of electrical contacts of the first plurality of electrical contacts of one or more trays through which the battery charger(s) may be connectable to one or more batteries of one or more UAVs. In these examples, the charge switching system may be configured to switchably, electrically connect or disconnect the battery charger(s) to the set(s) of electrical contacts according to an index in which the sets of electrical contacts, plurality of trays, batteries or UAVs of the rack system are listed in an order (e.g., top-down, left-to-right).

In other aspects of examples, a method is provided for operating battery-powered UAVs from a rack system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1A:
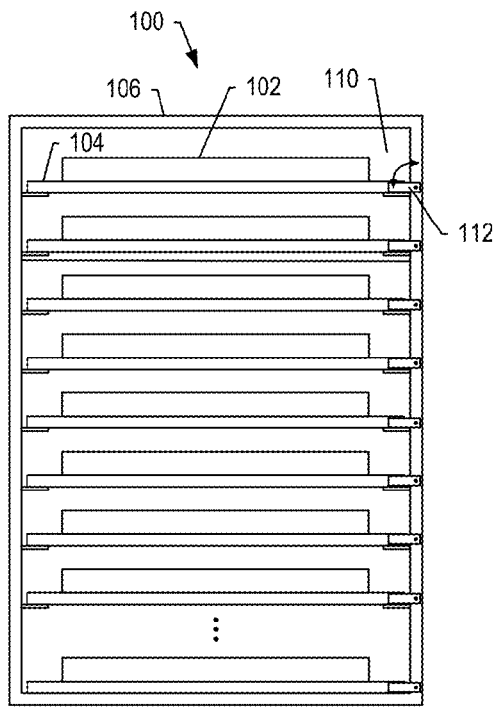
FIGS. 1A and 1B (collectively FIG. 1) illustrate schematic block diagrams of front and side views of a rack system for storing and charging a plurality of battery-powered unmanned aerial vehicles (UAVs), according to example implementations of the present disclosure.

Some implementations of the present disclosure will now be described more fully hereinafter with reference to the accompanying drawings, in which some, but not all variations of the disclosure are shown. Indeed, variations of the disclosure may be embodied in many different forms and should not be construed as limited to the examples set forth herein; rather, these are provided so that this disclosure will be thorough and complete, and will fully convey the scope of the disclosure to those skilled in the art. For example, reference may be made herein to values of or relationships between components, parameters, properties, variables or the like. These and other similar values or relationships may be absolute or approximate to account for variations that may occur, such as those due to engineering tolerances or the like. Like reference numerals refer to like elements throughout.

Figure 1B:
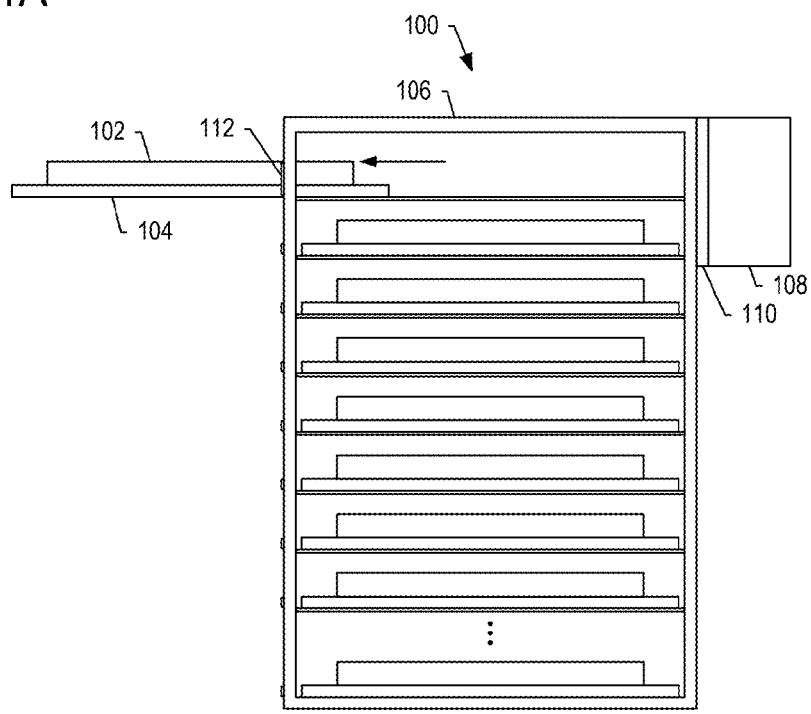

FIGS. 1A and 1B (collectively FIG. 1) illustrate schematic block diagrams of front and side views of a rack system 100 for storing and charging a plurality of battery-powered unmanned aerial vehicles (UAVs) 102, according to one example of the present disclosure. As shown, the rack system may include a plurality of trays 104 configured to hold respective ones of the UAVs, and a frame 106 configured to support the plurality of trays in a vertical arrangement (only one of various pluralities of various components in FIG. 1 and in other figures being specifically called out).

Each tray of the plurality of trays 104 may be connected to a battery-charging apparatus 108, and configured to electrically contact an UAV 102 on the tray to thereby permit charging the UAV while stored on the tray. As explained in greater detail below, the battery-charging apparatus of some examples may include one or more battery chargers electrically connected to one or more power supplies. The number of battery chargers and power supplies may vary depending on how quickly one desires to charge a certain number of batteries of a number of UAVs 102 (e.g., up to two battery chargers and power supplies per four-battery UAV). Generally, though, greater numbers of battery chargers and power supplies are able to charge a number of batteries of UAVs more quickly.

The battery-charging apparatus 108 may further include a charge switching system configured to switch the battery chargers between batteries of the UAVs 102, which may thereby permit a reduction in the number of battery chargers needed to charge the UAVs. The number of battery chargers may then control the rate that the UAVs may be charged, and the number or size of the power supplies desired of the rack system 100. Notably, the charge switching system may allow one to trade the charge time of the UAVs for the cost of the battery-charging apparatus.

In some examples, the trays 104 may have a semipermeable (e.g., mesh) construction to allow passage of at least water therethrough. Similarly, in some examples, the rack system 100 may further include a barrier 110 such as a waterproof and/or fireproof barrier located between the plurality of trays and battery-charging apparatus 108.

In more particular examples, the trays 104 may be formed from a plastic mesh or other structural material that drains water or small debris such as dirt. Plastic may reduce the possibility of the tray interfering with other electric components of the rack system 100, such as the battery-charging apparatus 108. The mesh construction may reduce the possibility of the tray holding residual water that may produce a short across various electric components. This as well as the barrier 110 may be particularly useful in instances in which the UAVs 102 are wet when the UAVs are returned to their respective trays, or when the rack system or UAVs require washing.

Each tray of the plurality of trays 104 may be horizontally movable with respect to the vertical arrangement. In some examples, the frame 106 may include a plurality of latches 112 each of which is configurable between a locked position to secure a tray of the plurality of trays in the vertical arrangement, an unlocked position to allow horizontal movement of the tray.

Figure 2A:
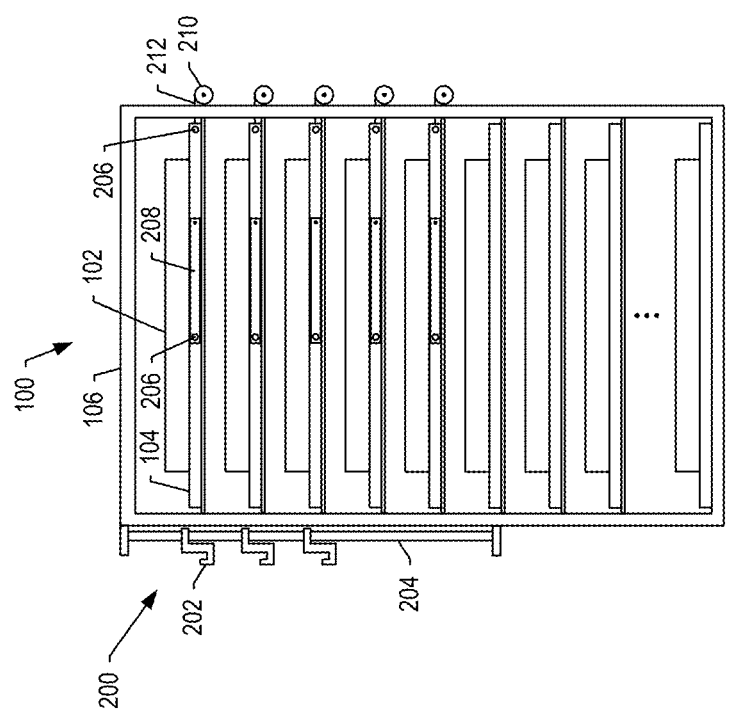
FIGS. 2A, 2B and 2C illustrate schematic block diagrams of a side view of the rack system in various states to highlight a drop or roll-down feature according to some example implementations of the present disclosure.
Figure 2B:
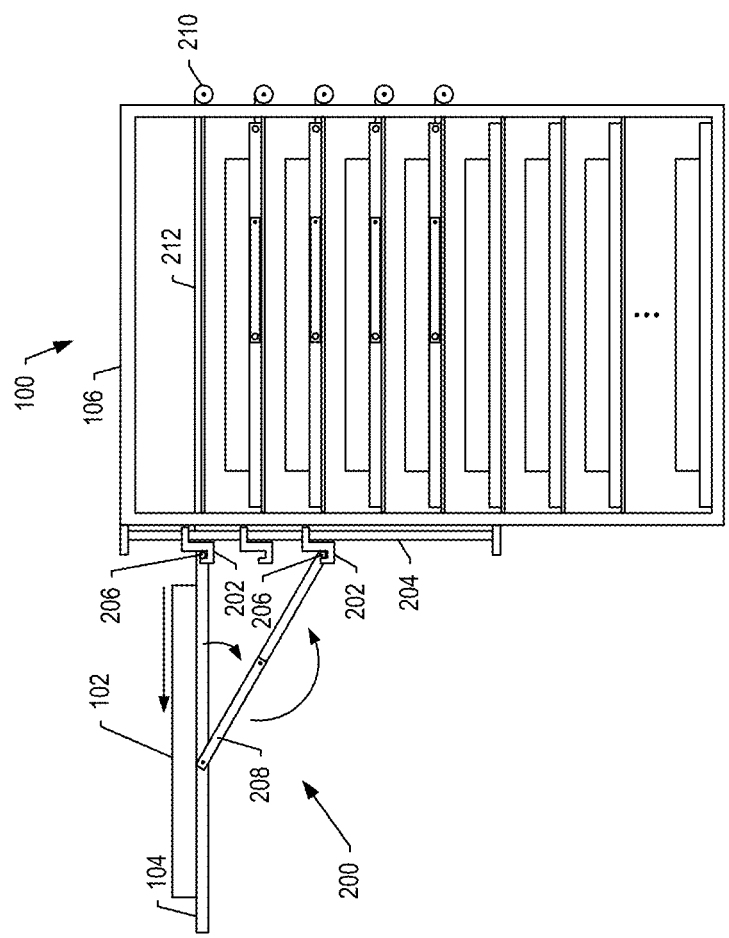
Figure 2C:
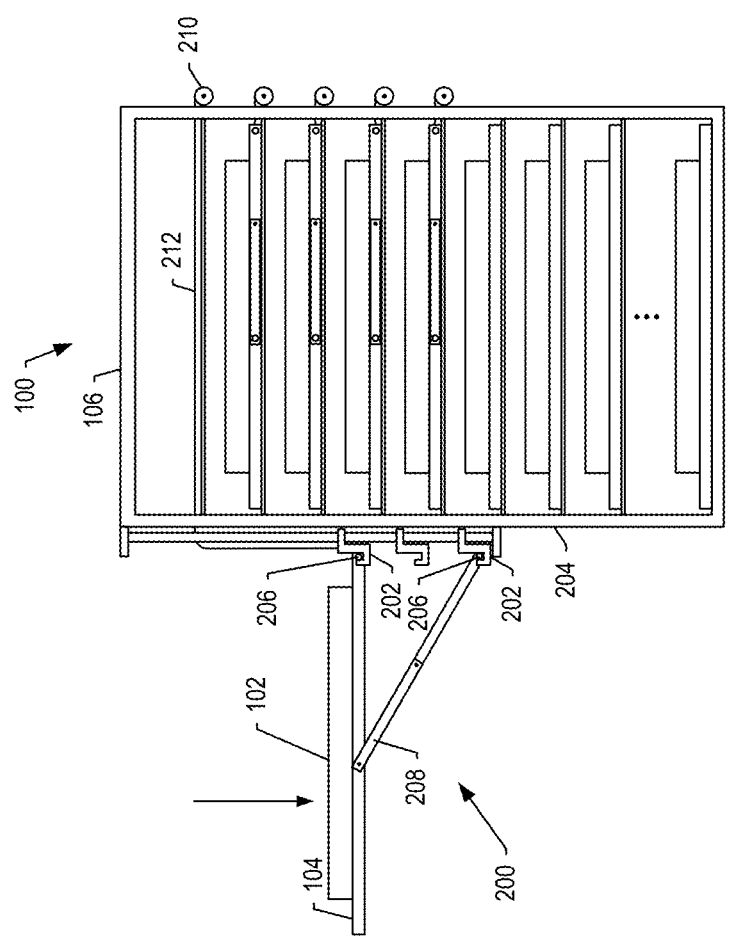

FIGS. 2A, 2B and 2C illustrate schematic block diagrams of a side view of the rack system 100 in various states to highlight a drop or roll-down feature 200 according to some examples, and in which some of the components shown in FIG. 1 may not be shown. This feature may generally permit the vertical lowering of one or more trays 104 to ease access to the UAVs 102 held thereby, and may be particularly useful for trays higher in the vertical arrangement. According to this feature, the rack system may further include one or more clips 202 affixed and vertically movable with respect to the frame 106, and into which one or more trays of the plurality of trays may be securable in an instance in which the tray is moved horizontally out from the vertical arrangement (FIG. 2B). The tray secured to the clip may thereby be horizontally secured and vertically movable with respect to the vertical arrangement (FIGS. 2B, 2C).

As shown in FIGS. 2A, 2B and 2C, for example, one or more pairs of clips 202 may be slidably secured a pair of opposing poles or tracks 204, which may in turn be mounted to opposing sides on the front of the frame 106. The tray(s) may in turn include a pair of pins 206 that may be securable to a pair of clips in an instance in which the tray is moved horizontally out from the vertical arrangement. In some examples, the tray(s) may further include an extendable and rotatable supports 208 that may also have a pair of pins. In these examples, the supports may be extendable and securable to another pair of clips in an instance in which the tray is moved horizontally out from the vertical arrangement. The supports may thereby provide additional support to the tray 104 and UAV 102 held thereby.

As also shown, in some examples, the rack system 100 may further include one or more reels 210 affixed to the frame 106 and having a cable 212 woundable thereabout. The cable may have opposing ends one of which is affixed to the reel and the other of which is affixed to the tray of the plurality of trays 104 secured to the clip 202. Here, the cable may control vertical movement of the tray secured to the clip. The cable may have a length sized according to an amount of horizontal and vertical movement allowed, or to enable enough horizontal and vertical movement of the tray to lower the tray to a more accessible height. In some examples, the reel may be spring-loaded and thereby facilitate controlled horizontal and vertical movement of the tray, and may include an automatic rewind feature to assist returning the tray to the vertical arrangement.

Figure 3A:
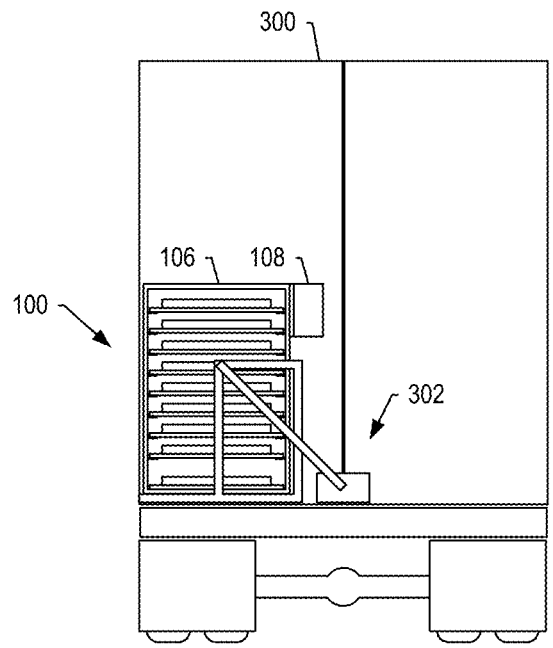
FIGS. 3A and 3B illustrate the rack system of FIG. 1 associated with a vehicle, which may be used for transport of the rack system and UAVs stored therein, according to example implementations of the present disclosure.
Figure 3B:
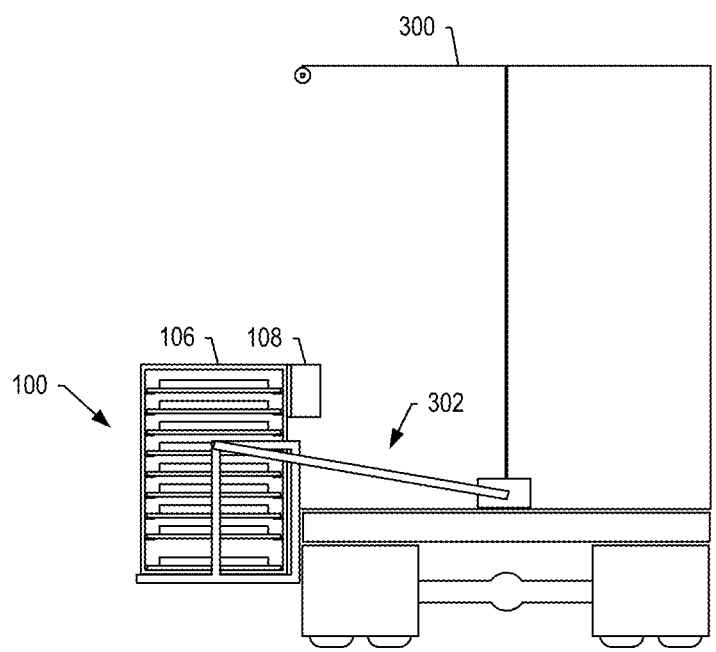

As shown in FIGS. 3A and 3B, in some examples, the rack system 100 may be associated with a vehicle 300, which may be used for transport of the rack system and UAVs 102 stored therein. By providing mobility to the rack system of UAVs, greater flexibility may be present for performing missions. In addition, the rack system may be removed from the vehicle or otherwise placed on the ground or in some other suitable location for accessing the UAVs. For example, the frame 106 of the rack system may be connectable to a lift 302 of the vehicle, such as a manual or automatic lift. The lift, then, may be configured to selectively raise the rack system for transport (FIG. 3A), and lower the rack system for accessing the plurality of trays 104 and UAVs (FIG. 3B). Also, in some examples, the battery-charging apparatus 108 may be electrically connectable to a generator of the vehicle, which may thereby produce electrical energy for charging the UAVs.

In some examples, the battery-charging apparatus 108 may be mounted or otherwise secured to the back of the rack system 100, and may face the interior of the vehicle 300, while the front of the rack system may be placed close to the exterior of the vehicle, as shown in FIGS. 3A and 3B. More particularly, for example, the rack system may be placed behind roll-up doors to facilitate its being raised and lowered. This feature may permit lowering the rack system several feet to improve the safety of operating the rack system, which may in turn reduce the need for a ladder or other unstable device to reach the top trays 104 or to clean the rack system that may otherwise be difficult to access.

Figure 4:
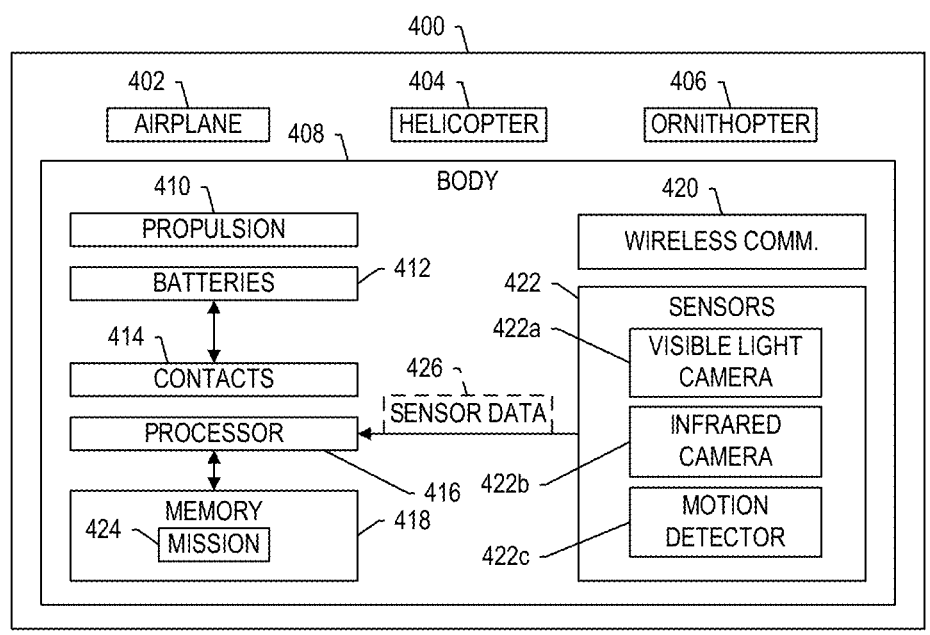
FIG. 4 illustrates a schematic block diagram of a UAV according to example implementations of the present disclosure.

FIG. 4 illustrates a schematic block diagram of a UAV 400 that in some examples may correspond to the UAV 102 of FIG. 1. In this illustrative example, the UAV may take a number of forms. For example, the UAV may take the form of an airplane 402, helicopter 404, ornithopter 406 or some other suitable type of aircraft.

As shown, the UAV 400 may include a body 408, propulsion system 410, batteries 412, electrical contacts 414, processor 416, non-transitory memory 418 or other storage device, wireless communications interface 420, one or more sensors 422 or the like. The body may provide a structure in which the different components of the UAV may be associated with one another, and may take the form of a fuselage. The body may include aerodynamic surfaces, such as wings or other types of surfaces.

The propulsion system 410 may be configured to move the UAV 400 in the air. In some examples, the propulsion system may be electronic and include an electric motor configured to rotate a propeller or other type of blade. In other examples, the propulsion system may be configured to move wings on the body 408 in instances in which the UAV takes the form of an ornithopter 406.

The batteries 412 may provide electrical energy for the UAV 400, and in some examples may be battery packs including multiple batteries or individual battery cells, such as in the case of lithium polymer batteries. The electrical contacts 414 may be connected to batteries and allow the batteries to be recharged in an appropriate rack system (e.g., rack system 100). In some examples, the electrical contacts may also be used to provide control lines to the batteries (e.g., 2:n+1 control lines per n-battery or n-cell battery pack), which may allow more advanced recharging of the batteries.

The processor 416 is generally any piece of computer hardware that is capable of processing data, and in some examples, the processor may include or otherwise be configured to communicate with the memory 418. In some examples, the processor may be configured to process or execute computer-readable program code, instructions and the like (generally "computer programs," e.g., software, firmware, etc.), and/or other suitable electronic information. One example of suitable information may be a mission 424, which may be executed by the processor and performed by the UAV 400.

The wireless communication interface 420 may be configured to provide communications between the UAV 400 and a remote location. The sensors 422 may include, for example, a visible light camera 422a, infrared light camera 422b, motion detector 422c, and/or other suitable types of sensors used to generate sensor data 426 for processing by the processor 416.

Figure 5A:
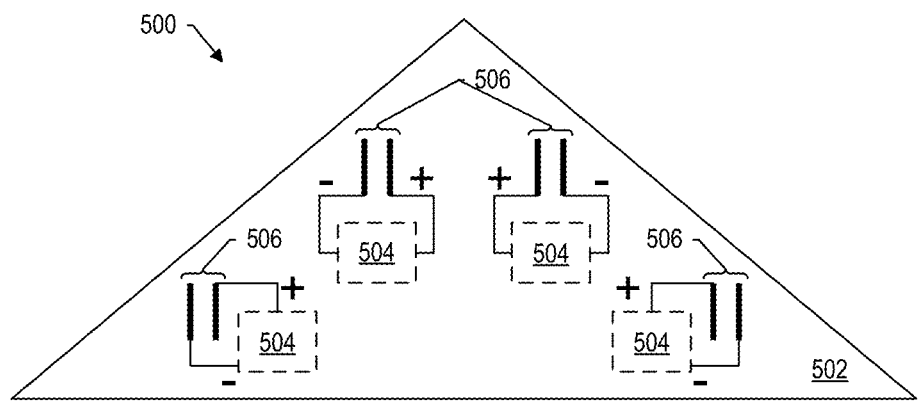
FIGS. 5A and 5B (collectively FIG. 5) illustrate schematic block diagrams of bottom and side views of a portion of a UAV in the form of a delta-wing UAV, according to example implementations of the present disclosure.
Figure 5B:
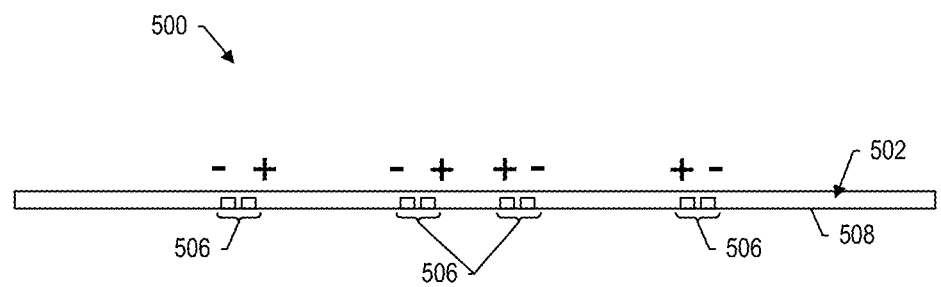

FIGS. 5A and 5B (collectively FIG. 5) illustrate schematic block diagrams of bottom and side views of a portion of a UAV 500 in the form of a delta-wing UAV, which in some examples may correspond to the UAV 102 of FIG. 1, or in turn the UAV 400 of FIG. 4. In FIG. 5, however, only a number of components of the UAV are shown. For example, the UAV 500 may include a body 502 (e.g., body 408) fabricated from lightweight high-density foam in the form of a single wing (e.g., six-foot wing). The UAV may also include a plurality of batteries 504 configured to provide electrical energy for the UAV. The batteries may be connected to respective electrical contacts 506 (e.g., electrical contacts 414), such as via respective wire (e.g., ten-gauge wire), to thereby allow the batteries to be recharged in an appropriate rack system (e.g., rack system 100). As shown more particularly in FIG. 5B, in some examples, the electrical contacts may be flush with an underside surface 508 of the UAV, which may reduce any impact of the contacts on the aerodynamics of the UAV.

Figure 6:
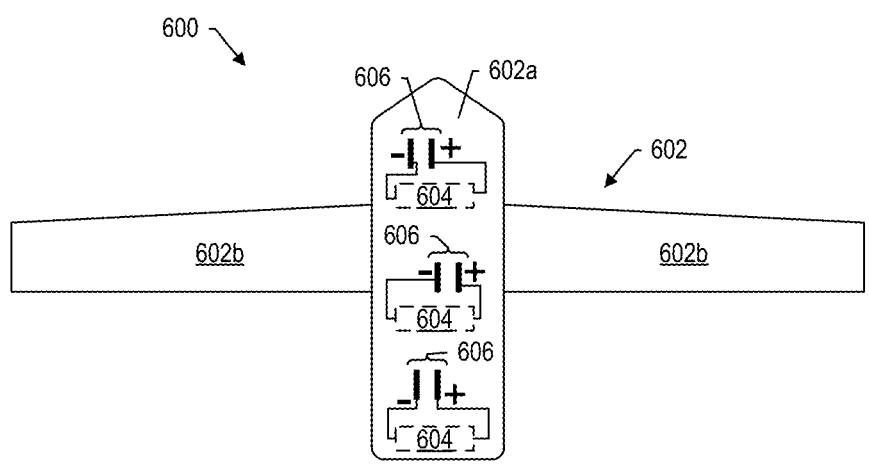
FIG. 6 illustrates a schematic block diagram of a bottom view of a portion of a UAV in the form of a swept-wing UAV, according to example implementations of the present disclosure.

FIG. 6 illustrates a schematic block diagram of a bottom view of a portion of a UAV 600 in the form of a swept-wing UAV, which in some examples may correspond to the UAV 102 of FIG. 1, or in turn the UAV 400 of FIG. 4. Similar to FIG. 5, in FIG. 6, only a number of components of the UAV are shown. For example, the UAV 600 may include a body 602 (e.g., body 408) with a fuselage 602a and a pair of swept wings 602b. The UAV may also include a plurality of batteries 604 configured to provide electrical energy for the UAV. The batteries may be connected to respective electrical contacts 606 (e.g., electrical contacts 414) to thereby allow the batteries to be recharged in an appropriate rack system (e.g., rack system 100). Although not separately shown here, similar to FIG. 5B, in some examples, the electrical contacts may be flush with an underside surface of the UAV, which may reduce any impact of the contacts on the aerodynamics of the UAV.

Figure 7:
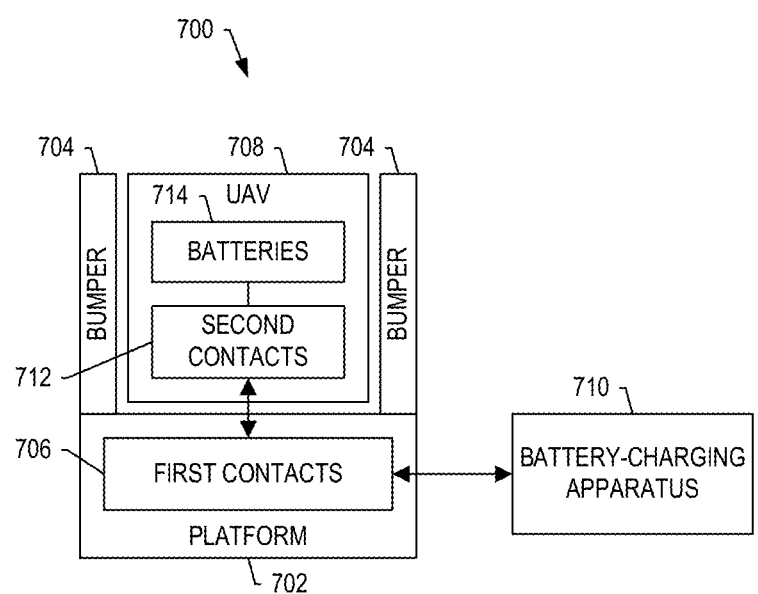
FIG. 7 illustrates a schematic block diagram of a tray of a plurality of trays of a rack system, according to example implementations of the present disclosure.

FIG. 7 illustrates a schematic block diagram of a tray 700 that in some examples may correspond to a tray of the plurality of trays 104 of FIG. 1. As shown, the tray 700 may include a platform 702, bumper 704 and first plurality of electrical contacts 706. The platform may be configured to carry a UAV 708 of a plurality of battery-powered UAVs (e.g., battery-powered aerial vehicles 102, 400, 500, 600). In some examples, the platform may have a semipermeable construction to allow passage of at least water therethrough. The bumper may be sized and positioned on the platform to guide the UAV to a resting position on the platform. The bumper may facilitate correct placement of the UAV on the platform, which may in turn reduce the possibility of shorting the contacts and providing less room for operator error.

The first plurality of electrical contacts 706 may be connected to a battery-charging apparatus 710 (e.g., battery-charging apparatus 108). This first plurality of electrical contacts may be configured to physically and electrically contact a respective second plurality of electrical contacts 712 (e.g., electrical contacts 414, 506, 606) connected to a respective plurality of batteries 714 (e.g., batteries 412, 504, 604) on the UAV 708 at the resting position on the platform. In some examples, electrical contacts of the first plurality of electrical contacts may be spring-loaded contacts configured to physically and electrically contact electrical contacts of the respective second plurality of electrical contacts that are flush with an underside surface of the UAV. This may facilitate the first plurality of electrical contacts making physical and electrical contact with the second plurality of electrical contacts, and increase the tolerance for deformations in the UAV's body (e.g., body 408, 502, 602) from normal wear and tear.

Figure 8:
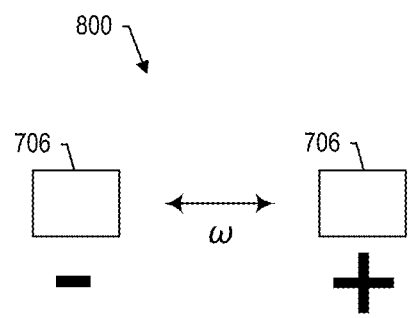
FIG. 8 illustrates an example size and arrangement of a set of first electrical contacts of a tray, according to example implementations of the present disclosure.
Figure 9:
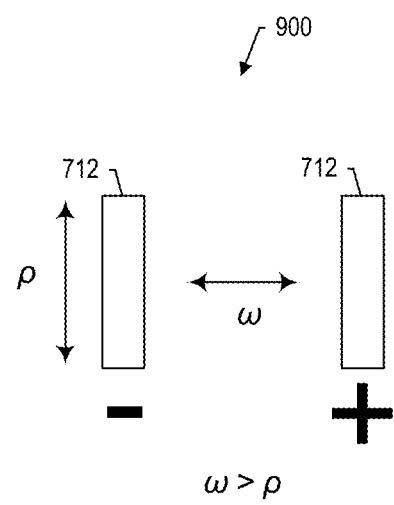
FIG. 9 illustrates an example size and arrangement of a set of second electrical contacts of a UAV that may be physically and electrically contacted with the set of first electrical contacts of FIG. 8, according example implementations of the present disclosure.

FIG. 8 illustrates an example size and arrangement 800 of a set of first electrical contacts 706 (of opposing polarity), according to example implementations of the present disclosure. FIG. 9 illustrates an example size and arrangement 900 of a set of second electrical contacts 712 (of opposing polarity) that may be physically and electrically contacted with the set of first electrical contacts of FIG. 8, according to example implementations of the present disclosure. As shown in FIGS. 8 and 9, in some examples, the first electrical contacts (of the tray 700) may be smaller in size than the second electrical contacts (of the UAV 708), which may reduce the risk of shorting the circuit between contacts of opposing polarity. The first electrical contacts may be approximately square-shaped, while the second electrical contacts may be longer and thinner. As also shown, the second electrical contacts of a set may have a length p less than the distance w between them, which may also facilitate reducing the likelihood of shorting the connection between the tray and UAV.

Figure 10A:
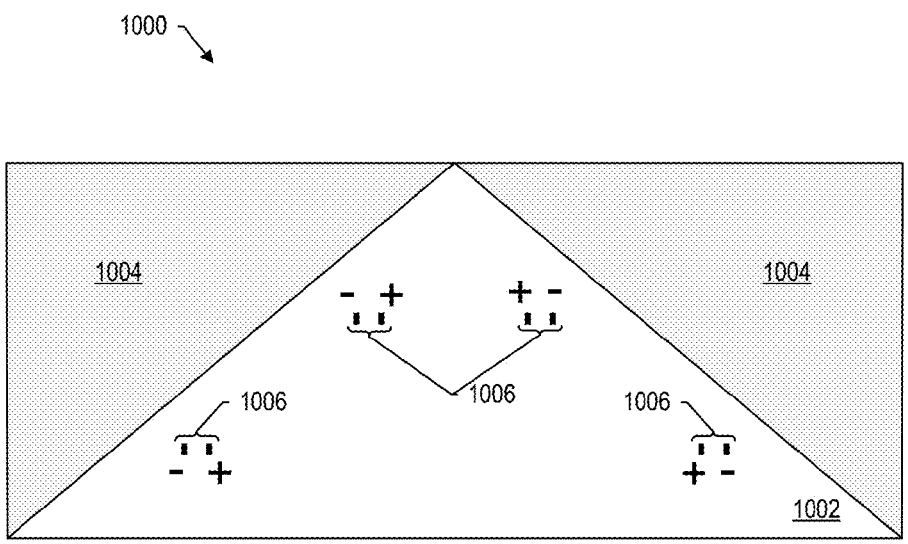
FIGS. 10A and 10B illustrate schematic block diagrams of top and side views of a portion of a tray suitable for use with the delta-wing UAV of FIG. 5, according to example implementations of the present disclosure.
Figure 10B:
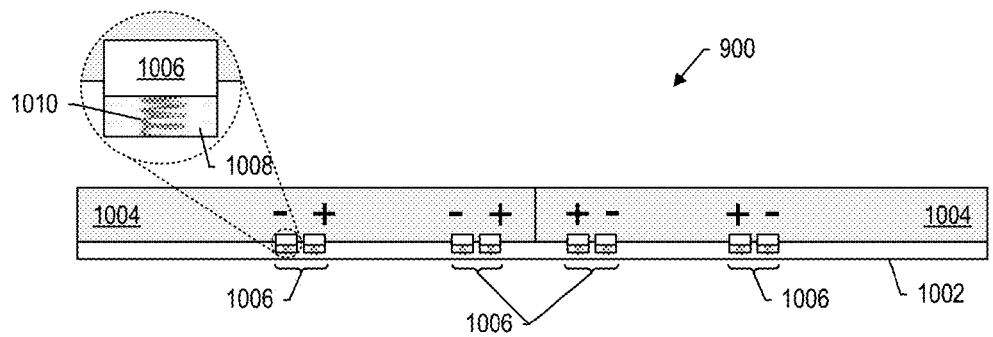

FIGS. 10A and 10B illustrate schematic block diagrams of top and side views of a portion of a tray 1000 suitable for use with the delta-wing UAV 500 of FIG. 5, and which in some examples may correspond to the tray 104 of FIG. 1, or in turn the tray 700 of FIG. 7. As shown, the tray 1000 may include a platform 1002 (e.g., platform 702), bumper 1004 (e.g., bumper 704) and first plurality of electrical contacts 1006 (e.g., electrical contacts 706). The bumper may be sized and positioned on the platform to guide the delta-wing UAV to a resting position on the platform. As shown, for example, the bumper may be sized and positioned to define an opening on a top surface of the platform in the shape of the respective UAV, and within which the UAV may be placed in its resting position on the platform. In some examples, the bumper may be a single-piece bumper, and in other examples, a multi-piece bumper.

The first plurality of electrical contacts 1006 may be configured to physically and electrically contact the respective second plurality of electrical contacts (e.g., electrical contacts 506) on the delta-wing UAV 500 at its resting position on the platform 1002. In some examples, electrical contacts of the first plurality of electrical contacts may be spring-loaded. As shown, for example, the platform may define recesses 1008 within which springs 1010 may be secured to electrical contacts of the first plurality of electrical contacts.

Figure 11:
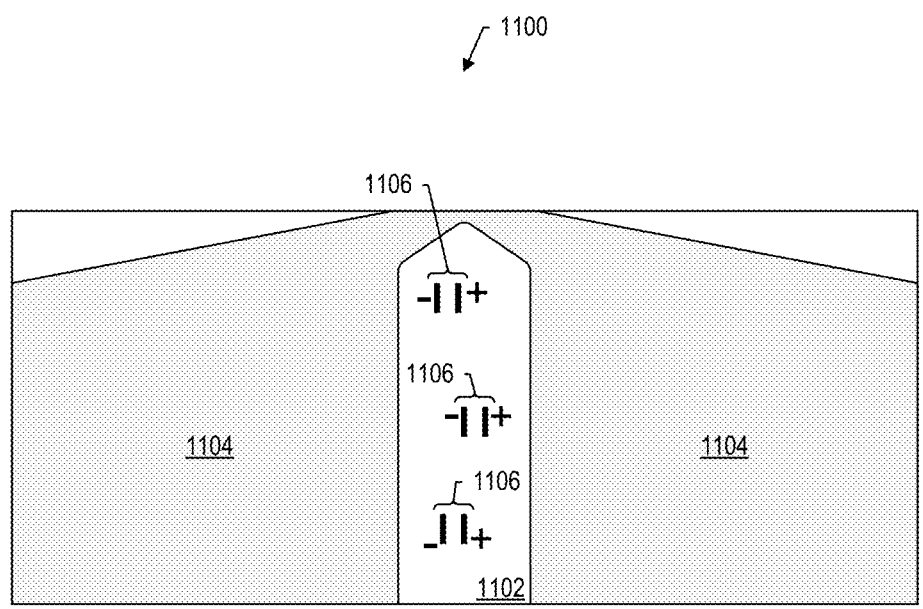
FIG. 11 illustrates a schematic block diagram of a top view of a portion of a tray suitable for use with the swept-wing UAV of FIG. 6, according to example implementations of the present disclosure.

FIG. 11 illustrates a schematic block diagram of a top view of a portion of a tray 1100 suitable for use with the swept-wing UAV 600 of FIG. 6, and which in some examples may correspond to the tray 104 of FIG. 1, or in turn the tray 700 of FIG. 7. As shown, the tray 1100 may include a platform 1102 (e.g., platform 702), bumper 1104 (e.g., bumper 704) and first plurality of electrical contacts 1106 (e.g., electrical contacts 706). The bumper may be sized and positioned on the platform to guide the swept-wing UAV to a resting position on the platform. As shown, for example, the bumper may be sized and positioned to define an opening on a top surface of the platform in the shape of the fuselage 602a of the respective UAV, and within which the fuselage may be placed in its resting position on the platform. In some examples, the bumper may be a single-piece bumper, and in other examples, a multi-piece bumper.

The first plurality of electrical contacts 1106 may be configured to physically and electrically contact the respective second plurality of electrical contacts (e.g., electrical contacts 606) on the swept-wing UAV 600 at its resting position on the platform 1102. Although not separately shown, in some examples, electrical contacts of the first plurality of electrical contacts may be spring-loaded. Similar to before, for example, the platform may define recesses within which springs may be secured to electrical contacts of the first plurality of electrical contacts.

Figure 12:
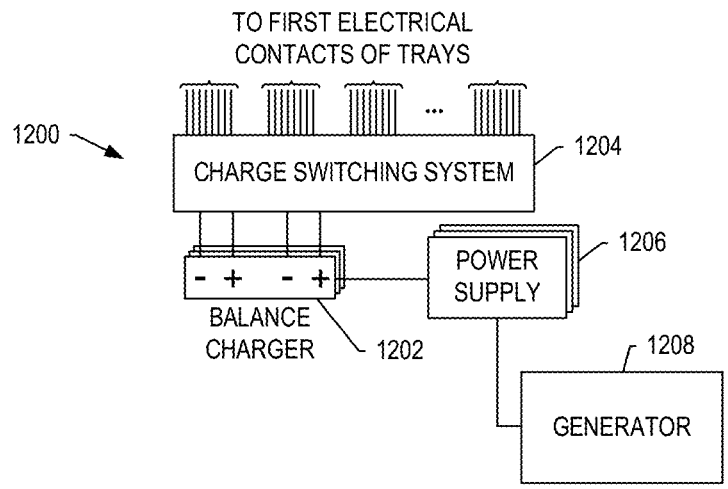
FIG. 12 illustrates a schematic block diagram of a battery-charging apparatus according to example implementations of the present disclosure.

FIG. 12 illustrates a schematic block diagram of a battery-charging apparatus 1200 that in some examples may correspond to the battery-charging apparatus 108 of FIG. 1, or in turn the battery-charging apparatus 710 of FIG. 7. As shown, the battery-charging apparatus 1200 may include one or more battery chargers 1202 and a charge switching system 1204. The battery charger(s) may be electrically connected to one or more power supplies 1206, which may in turn be electrically connectable to a generator 1208 such as that of a vehicle (e.g., vehicle 300) configured to transport the rack system of which the battery-charging apparatus may be part. The power supply design may drive the desired size of the generator. In some examples, the battery charger(s) may be balance charger(s) configured to distribute charging among the batteries or cells of multi-battery or multi-cell battery packs.

The charge switching system 1204 may be electrically connected to the battery charger(s) 1202 and first plurality of electrical contacts (e.g., first electrical contacts 706) of each tray of the plurality of trays (e.g., trays 700). The charge switching system 1204 may include a processor (computer hardware) including or otherwise configured to communicate with memory such as to process or execute computer programs and/or other suitable electronic information. The charge switching system may be configured to switchably, electrically connect or disconnect the battery charger(s) and first plurality of electrical contacts of each tray of the plurality of trays. In some examples, each of the battery charger(s) in any given instance may be electrically connectable to the first plurality of electrical contacts of one or more but fewer than all of the plurality of trays.

In some examples, the charge switching system 1204 may electrically connect each battery charger 1202 to one or more sets of electrical contacts (of opposing polarity) of the first plurality of electrical contacts of one or more trays through which the battery charger may be connected to one or more batteries of one or more UAVs, and may do so according to an index in which the sets of electrical contacts, trays, batteries or UAVs of the rack system may be listed in some order, such as top-down, left-to-right in the rack system. The charge switching system may thereby cause the battery charger to charge the respective batteries, after which the charge switching system may appropriately mark the index, disconnect the battery charger from the respective set(s) of electrical contacts, and connect the battery charger to the next set(s) of electrical contacts indicated in the index and repeat the process. This may then continue until all of the batteries of the UAVs held by the rack system are charged.

Figure 13:
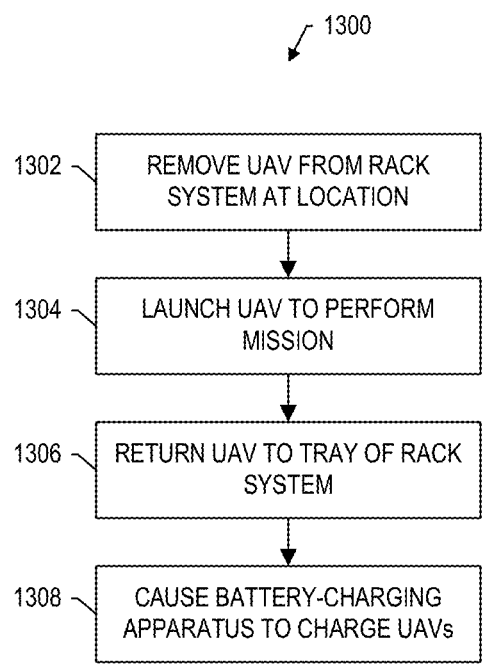
FIG. 13 illustrates a flowchart illustrating various steps in a method according to example implementations of the present disclosure.

Reference is now made to FIG. 13, which illustrates a flowchart illustrating various steps in a method 1300 according to example implementations. As shown in block 1302, the method may include removing a particular UAV of a plurality of battery-powered UAVs 102 from a rack system 100 at a location. The rack system may include a plurality of trays 104 supported in a vertical arrangement and holding respective ones of the plurality of battery-powered UAVs. As shown in FIG. 7, for example, each tray 700 of the plurality of trays may include a platform 702 carrying a UAV 708 of the plurality of battery-powered UAVs, and a bumper 704 sized and positioned on the platform to guide the UAV to a resting position on the platform. The tray may also include a first plurality of electrical contacts 706 electrically connected to a battery-charging apparatus 710.

Again referring to FIG. 13, the method may also include launching the particular UAV 102 to perform a mission at or in a vicinity of the location; and thereafter, returning the particular UAV to a tray of the plurality of trays 104 of the rack system 100 (the same tray from which the UAV may have been removed or another tray), as shown in blocks 1304, 1306. In the example of FIG. 7, this may include the particular UAV 708 being guided by the bumper 704 to the resting position on the platform 702 of the tray 700. It may also include the first plurality of electrical contacts 706 of the tray physically and electrically contacting a respective second plurality of electrical contacts 712 electrically connected to a respective plurality of batteries 714 on the particular UAV at the resting position on the platform. And as shown in block 1308 of FIG. 13, in some examples, the method may further include causing the battery-charging apparatus 710 to charge at least some of the plurality of battery-powered UAVs and including the particular UAV.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A rack system comprising:
 a plurality of trays configured to hold a respective plurality of battery-powered unmanned aerial vehicles; and a frame configured to support the plurality of trays in a vertical arrangement, wherein each tray of the plurality of trays comprises:
 a platform configured to carry an unmanned aerial vehicle of the plurality of battery-powered unmanned aerial vehicles;
 a bumper sized and positioned on the platform to guide the unmanned aerial vehicle to a resting position on the platform; and
 a first plurality of electrical contacts connected to a battery-charging apparatus, and configured to physically and electrically contact a respective second plurality of electrical contacts connected to a respective plurality of batteries on the unmanned aerial vehicle at the resting position on the platform.

2. The rack system of claim 1, wherein electrical contacts of the first plurality of electrical contacts are spring-loaded contacts configured to physically and electrically contact electrical contacts of the respective second plurality of electrical contacts that are flush with an underside surface of the unmanned aerial vehicle.

3. The rack system of claim 1, wherein the platform has a semipermeable construction to allow passage of at least water therethrough.

4. The rack system of claim 1 further comprising the battery-charging apparatus, and a barrier that is at least one of waterproof or fireproof located between the plurality of trays and battery-charging apparatus.

5. The rack system of claim 1 further comprising the battery-charging apparatus, wherein the battery-charging apparatus comprises:
 one or more battery chargers electrically connected to one or more power supplies; and
 a charge switching system electrically connected to the one or more battery chargers and first plurality of electrical contacts of each tray of the plurality of trays,
 wherein the charge switching system is configured to switchably, electrically connect or disconnect the one or more battery chargers and first plurality of electrical contacts of each tray of the plurality of trays, each of the one or more battery chargers in any given instance being electrically connectable to the first plurality of electrical contacts of one or more but fewer than all of the plurality of trays.

6. The rack system of claim 1, wherein each tray of the plurality of trays is horizontally movable with respect to the vertical arrangement, and
 wherein the frame includes a plurality of latches each of which is configurable between a locked position to secure a tray of the plurality of trays in the vertical arrangement, an unlocked position to allow horizontal movement of the tray.

7. The rack system of claim 1, wherein each tray of the plurality of trays is horizontally movable with respect to the vertical arrangement, and wherein the rack system further comprises:
 a clip affixed and vertically movable with respect to the frame, and into which a tray of the plurality of trays is securable in an instance in which the tray is moved horizontally out from the vertical arrangement, the tray secured to the clip thereby being horizontally secured and vertically movable with respect to the vertical arrangement.

8. The rack system of claim 7 further comprising:
 a reel affixed to the frame and having a cable woundable thereabout, the cable having opposing ends one of which is affixed to the reel and the other of which is affixed to the tray of the plurality of trays secured to the clip, the cable controlling vertical movement of the tray secured to the clip.

9. The rack system of claim 1 further comprising the battery-charging apparatus electrically connectable to a generator of a vehicle configured to transport the rack system,
 wherein the frame is connectable to a lift of the vehicle, the lift being configured to selectively raise the rack system for transport, and lower the rack system for accessing the plurality of trays and unmanned aerial vehicles held thereby.

10. A battery-charging apparatus comprising:
 one or more battery chargers electrically connected to one or more power supplies; and
 a charge switching system electrically connected to the one or more battery chargers and a first plurality of electrical contacts of each tray of a plurality of trays of a rack system including the plurality of trays supported in a vertical arrangement and configured to hold a respective plurality of battery-powered unmanned aerial vehicles, each tray of the plurality of trays including:
  a platform carrying an unmanned aerial vehicle of the plurality of battery-powered unmanned aerial vehicles; and
  a bumper sized and positioned on the platform to guide the unmanned aerial vehicle to a resting position on the platform; and
  the first plurality of electrical contacts configured to physically and electrically contact a respective second plurality of electrical contacts electrically connected to a respective plurality of batteries on the unmanned aerial vehicle at the resting position on the platform,
 wherein the charge switching system is configured to switchably, electrically connect or disconnect the one or more battery chargers and first plurality of electrical contacts of each tray of the plurality of trays, each of the one or more battery chargers in any given instance being electrically connectable to the first plurality of electrical contacts of one or more but fewer than all of the plurality of trays.

11. The battery-charging apparatus of claim 10 further comprising the one or more power supplies that are electrically connectable to a generator of a vehicle configured to transport the rack system.

12. The battery-charging apparatus of claim 10, wherein the charge switching system being configured to switchably, electrically connect or disconnect the one or more battery chargers includes being configured to switchably, electrically connect or disconnect the one or more battery chargers to one or more sets of electrical contacts of the first plurality of electrical contacts of one or more trays through which the one or more battery chargers are connectable to one or more batteries of one or more unmanned aerial vehicles.

13. The battery-charging apparatus of claim 12, wherein the charge switching system is configured to switchably, electrically connect or disconnect the one or more battery chargers to the one or more sets of electrical contacts according to an index in which the sets of electrical contacts, plurality of trays, batteries or unmanned aerial vehicles of the rack system are listed in an order.

14. A method comprising:
 removing a particular unmanned aerial vehicle of a plurality of battery-powered unmanned aerial vehicles from a rack system at a location, the rack system including a plurality of trays supported in a vertical arrangement and holding respective ones of the plurality of battery-powered unmanned aerial vehicles, each tray of the plurality of trays including:
- a platform carrying an unmanned aerial vehicle of the plurality of battery-powered unmanned aerial vehicles;
- a bumper sized and positioned on the platform to guide the unmanned aerial vehicle to a resting position on the platform; and
- a first plurality of electrical contacts connected to a battery-charging apparatus;

launching the particular unmanned aerial vehicle to perform a mission at or in a vicinity of the location; and thereafter, returning the particular unmanned aerial vehicle to a tray of the plurality of trays of the rack system, including the particular unmanned aerial vehicle being guided by the bumper to the resting position on the platform of the tray, and the first plurality of electrical contacts of the tray physically and electrically contacting a respective second plurality of electrical contacts connected to a respective plurality of batteries on the particular unmanned aerial vehicle at the resting position on the platform.

15. The method of claim 14, wherein electrical contacts of the first plurality of electrical contacts are spring-loaded contacts that physically and electrically contact electrical contacts of the respective second plurality of electrical contacts that are flush with an underside surface of the particular unmanned aerial vehicle.

16. The method of claim 14 further comprising:
causing the battery-charging apparatus to charge at least some of the plurality of battery-powered unmanned aerial vehicles and including the particular unmanned aerial vehicle, wherein the battery-charging apparatus includes:
one or more battery chargers electrically connected to one or more power supplies; and
a charge switching system electrically connected to the one or more battery chargers and first plurality of electrical contacts of each tray of the plurality of trays,
wherein the charge switching system switchably, electrically connects or disconnects the one or more battery chargers and first plurality of electrical contacts of each tray of the plurality of trays, each of the one or more battery chargers in any given instance being electrically connectable to the first plurality of electrical contacts of one or more but fewer than all of the plurality of trays.

17. The method of claim 14, wherein each tray of the plurality of trays is horizontally movable with respect to the vertical arrangement, and the frame includes a plurality of latches for respective ones of the plurality of trays, and
wherein removing the particular unmanned aerial vehicle from the rack system includes removing the particular unmanned aerial vehicle from a tray of the plurality of trays, which includes moving a latch of the plurality of latches from a locked position securing the tray in the vertical arrangement, to an unlocked position allowing horizontal movement of the tray.

18. The method of claim 14, wherein each tray of the plurality of trays is horizontally movable with respect to the vertical arrangement, wherein the rack system further includes a clip vertically movable with respect to the vertical arrangement, and
wherein removing the particular unmanned aerial vehicle from the rack system includes removing the particular unmanned aerial vehicle from a tray of the plurality of trays, which includes horizontally moving the tray out from the vertical arrangement and securing the tray to the clip, the tray secured to the clip thereby being horizontally secured and vertically movable with respect to the vertical arrangement.

19. The method of claim 14, wherein the battery-charging apparatus is electrically connected to a generator of a vehicle configured to transport the rack system, and the frame is connected to a lift of the vehicle, and
wherein the method further comprises causing the lift to raise the rack system for transport before removing or after returning the particular unmanned aerial vehicle, or lower the rack system for accessing the plurality of trays and unmanned aerial vehicles held thereby before removing the particular unmanned aerial vehicle.

* * * * *